(12) United States Patent
Derman et al.

(10) Patent No.: US 6,401,504 B1
(45) Date of Patent: Jun. 11, 2002

(54) THREADED HOLE LOCKING DEVICE

(75) Inventors: Jay S. Derman, Palos Verdes Peninsula; Greg Zeren, Sunnyvale, both of CA (US)

(73) Assignee: Acco Brands, Inc., Lincolnshire, IL (US)

( * ) Notice: Subject to any disclaimer, the term of this patent is extended or adjusted under 35 U.S.C. 154(b) by 0 days.

(21) Appl. No.: 09/597,872

(22) Filed: Jun. 20, 2000

Related U.S. Application Data

(63) Continuation-in-part of application No. 09/233,741, filed on Jan. 20, 1999, now abandoned.

(51) Int. Cl.[7] .............................................. H01R 13/639

(52) U.S. Cl. ........................................ 70/230; 70/232

(58) Field of Search ............................... 70/14, 18, 19, 70/57, 58, 203, 212, 229, 230, 232

(56) References Cited

U.S. PATENT DOCUMENTS

| | | | | |
|---|---|---|---|---|
| 4,945,738 A | * | 8/1990 | Blair et al. | .................... 70/161 |
| 5,398,530 A | * | 3/1995 | Derman | ......................... 70/58 |

* cited by examiner

*Primary Examiner*—William A. Cuchlinski, Jr.
*Assistant Examiner*—Marthe Y. Marc-Coleman
(74) *Attorney, Agent, or Firm*—McCutchen, Doyle, Brown & Enersen, LLP

(57) ABSTRACT

A device that is a simple means to secure an equipment having a threaded hole and a localizer such as a wire cable, chain or padlock. The device consists of an attachment connector having a threaded rod and attached to the attachment connector. The attachment connector includes an obstructor, which when the device is tightened in place, interferes with the equipment such that the attachment rod can not be rotated and the device removed. A localizer, such as a cable for example, attached to the attachment plate, constrains movement of the attachment plate (and the attached equipment) to be within a predetermined distance from an object other than the equipment.

5 Claims, 10 Drawing Sheets

THREADED HOLE LOCKING DEVICE

CROSS-REFERENCES TO RELATED APPLICATIONS

This application is a Continuation in Part of Ser. No. 09/233,741, filed Jan. 20, 1999, now abandoned, the disclosure of which is incorporated herein by reference for all purposes.

BACKGROUND OF THE INVENTION

This invention relates generally to devices useful for securing any equipment or appliance having a threaded hole, and specifically to securing small portable electronic devices, such as, for example, personal digitial assistants or PDAs.

Expensive and small equipment, such as cameras and small electronic devices for example, often include no ready method or mechanism for attachment for securing the equipment. To secure the equipment, the owner may be expected to place it in a container of some sort which may be locked or otherwise secured.

There are also larger equipment such as printers, facsimile machines and scanners that similarly include no attachment mechanism for securing the items. However, an increasing number of items now include threaded holes that are open only to the outside of the equipment. Cameras, for example, have long included such threaded holes, which are intended to be used for mounting the camera on a stand or tripod.

SUMMARY OF THE INVENTION

The present invention provides a simple attachment device for securing portable equipment having an exposed threaded opening, such as a standard tripod mounting opening, for example. The device quickly and efficiently permits the attachment and detachment to a suitable portable device. A cable secures the attachment device to a second object other than the portable device, thereby inhibiting the unauthorized movement of the portable device further than the length of the cable.

In one preferred embodiment of the present invention, it includes an attachment device for a portable equipment having a housing including a first side and a second side generally orthogonal to the first side with an externally exposed threaded opening in the first side. The device includes an attachment connector having an attachment rod including threads complementary to the threaded opening wherein rotation of the attachment rod in an engaging direction mates the attachment rod to the threaded opening and rotation of the attachment rod in a disengaging direction detaches the attachment rod from the threaded opening; an obstructor, coupled to the attachment connector and extending, when in a locking mode, beside the second side of the housing to inhibit rotation of the attachment rod in the disengaging direction; and a localizer, coupled to the attachment connector, for attaching to an object other than to the portable equipment, to constrain movement of the portable equipment to within a limited distance of the object.

An advantage of the invention over other methods is its relative ease of use and convenience to the user.

Reference to the remaining portions of the specification, including the drawing and claims, will realize other features and advantages of the present invention. Further features and advantages of the present invention, as well as the structure and operation of various embodiments of the present invention, are described in detail below with respect to the accompanying drawing. In the drawing, like reference numbers indicate identical or functionally similar elements.

DESCRIPTION OF THE SPECIFIC EMBODIMENTS

Figure 1:
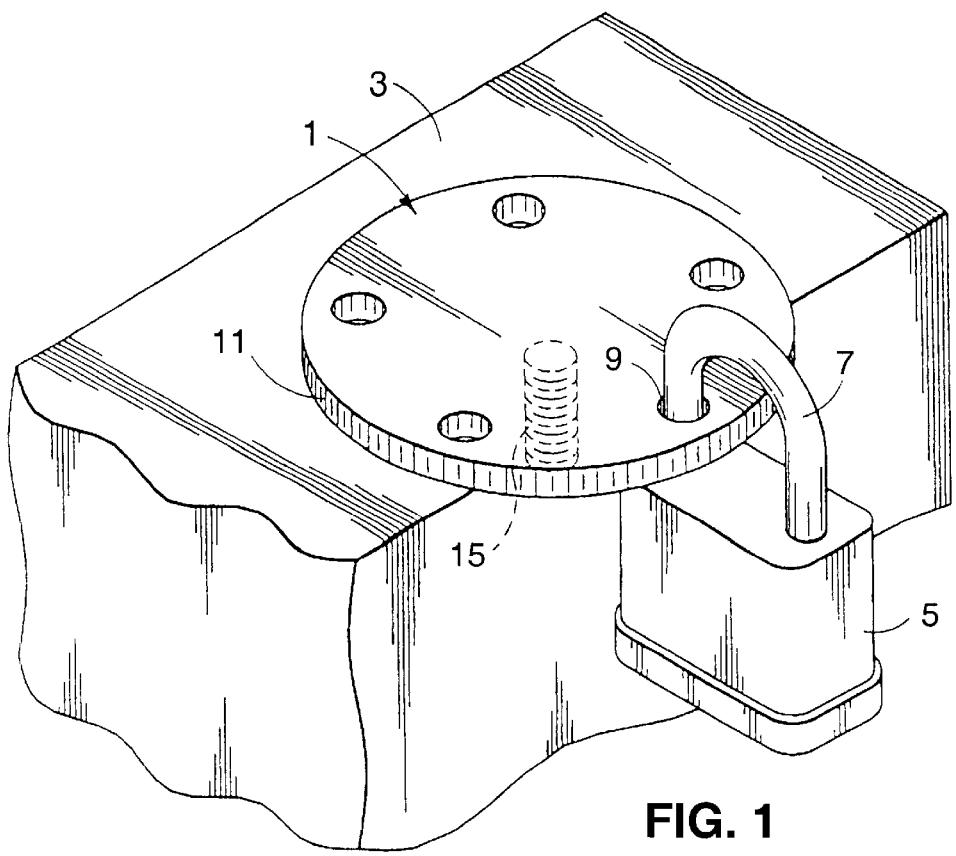
FIG. 1 is a generally perspective view showing the preferred embodiment of the present invention device attached to a threaded hole in an equipment, with a padlock attached to the device top portion for securing it.
Figure 2:
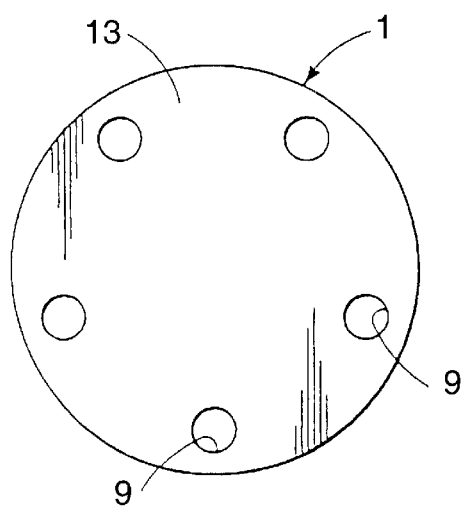
FIG. 2 is a top view of the present invention, particularly showing a disk configuration of the top portion.

Referring particularly to the drawings, there is shown in FIG. 1 a perspective view of a threaded hole locking device 1 according to the present invention, inserted in a threaded hole in an equipment 3. A padlock 5 is shown with its locking arm 7, also referred to herein as an obstructor, inserted through a hole 9 in the top portion of the device 1.

Figure 3:
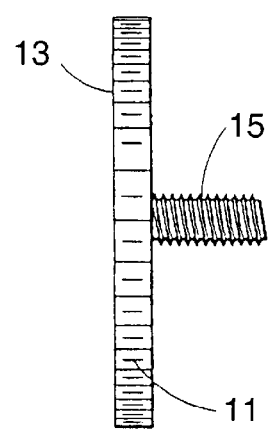
FIG. 3 is a side elevation view of the present invention, showing a threaded rod attached to a top portion.

A top view of the device 1 is shown in FIG. 1 and a side view is shown in FIG. 3.

As shown in FIG. 1, the padlock 5 position prevents the top portion 13 which serves as a handle or attachment connector, from being rotated counter-clockwise until the device 1 is released from the equipment 3. The padlock 5 in combination with a chain or cable, a preferred implementation for a localizer, connects the equipment to a secure location. When attached, the equipment remains within a predetermined distance to the secure location by attaching a second end of the chain or cable to an object different than the equipment and located at the secure location. In some embodiments, it is desirable to localize the device by a system other than cables or chains or physical connection. In such embodiments, the localizer may be a magnetic tag or other tag or material similar, for example, to other inventory control systems that inhibit unauthorized removal of protected products. In these embodiments, the protected equipment may not be moved too far from the secure location without activating an alarm or other indication and thereby alerting that the movement of the equipment to its present location was unauthorized.

Alternatively in other preferred embodiments, a chain or cable without a padlock may be used to achieve the obstructor purpose.

The top portion 13 includes grasping means to aid in manually rotating the device. In this embodiment it is shown as a milled edge 11. However, any suitable grasping means such as an upward projecting knob or handle could be used instead. A plurality of through holes 9 are located and distributed near the periphery of the top portion 9. These holes are sized to accommodate the locking arm of a padlock or a chain or cable.

It should be noted that any shape may be used for the top portion, so long as at least one part of it having a through hole, is able to extend over an edge of the equipment to which the device is threaded. A preferred embodiment shape for the top portion is a disk, because that is deemed simple and easy to fabricate. However, it is not the only allowable shape to facilitate rotating a threaded rod.

A threaded rod 15, or attachment rod, is attached with one end, to the center of the top portion 13, so that the rod 15 projects at 90 degrees to the bottom surface plane of the top portion 13. Together with the top portion, the rod 15 serves to securely attach the device to any equipment having a threaded hole.

Figure 4:
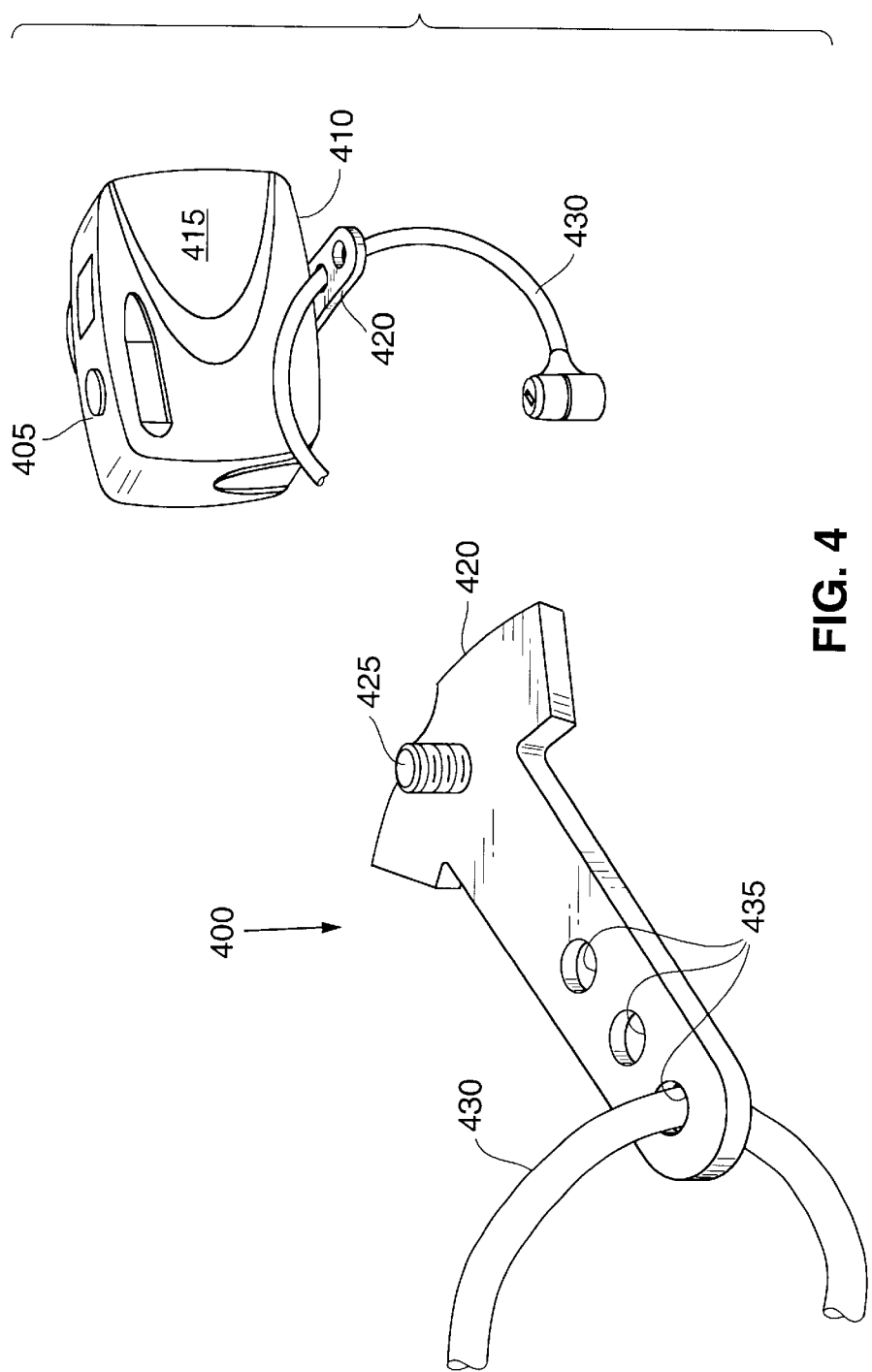
FIG. 4 is a perspective view of an alternate embodiment for an attachment device used to inhibit the theft of portable equipment having an externally exposed threaded opening.

FIG. 4 is a perspective view of an alternate embodiment for an attachment device 400 used to inhibit the theft of portable equipment 405 having an externally exposed threaded opening, e.g., a camera with a tripod opening (not shown). Portable equipment 405 includes a first side 410 and a second side 415 generally orthogonal to first side 410.

Attachment device 400 includes an attachment plate 420 having a threaded attachment rod 425 and an object 430, such as for example a chain or cable. Attachment plate 420 has a portion defining a succession of apertures 435 having different spacings relative to attachment rod 425 and sized to accommodate object 430.

In operation, attachment rod 425 is matched to the exposed threaded opening in portable equipment 405 and attachment plate 420 is rotated in a thread engaging direction to mate attachment rod 425 and the threaded exposed hole located in side 410 of portable equipment 405. Once sufficiently mated, one or more apertures 435 extend beyond an edge of portable equipment 405. The succession of apertures permits attachment device 400 to operate in conjunction with different sized portable equipment.

Once mating of attachment connector 420 to portable equipment 405 is complete, object 430 is passed through one of apertures 435, preferably the nearest to attachment rod 425 and wholly exposed aperture 435. Object 430, passed through aperture 435 while attachment connector is securely mated to portable equipment 405 functions as an obstructor which inhibits rotation of attachment rod 425 in an thread disengaging direction. Object 430 inhibits rotation in the thread disengaging direction by interfering with side 415 and thereby maintains the coupling of attachment connector 420 to portable equipment 405.

Object 430, being a chain or cable in this preferred embodiment, also functions as a localizer to constrain movement of portable equipment 405 to a predetermined distance from a second object (other than portable equipment 405) to which object 430 is affixed.

Figure 5:
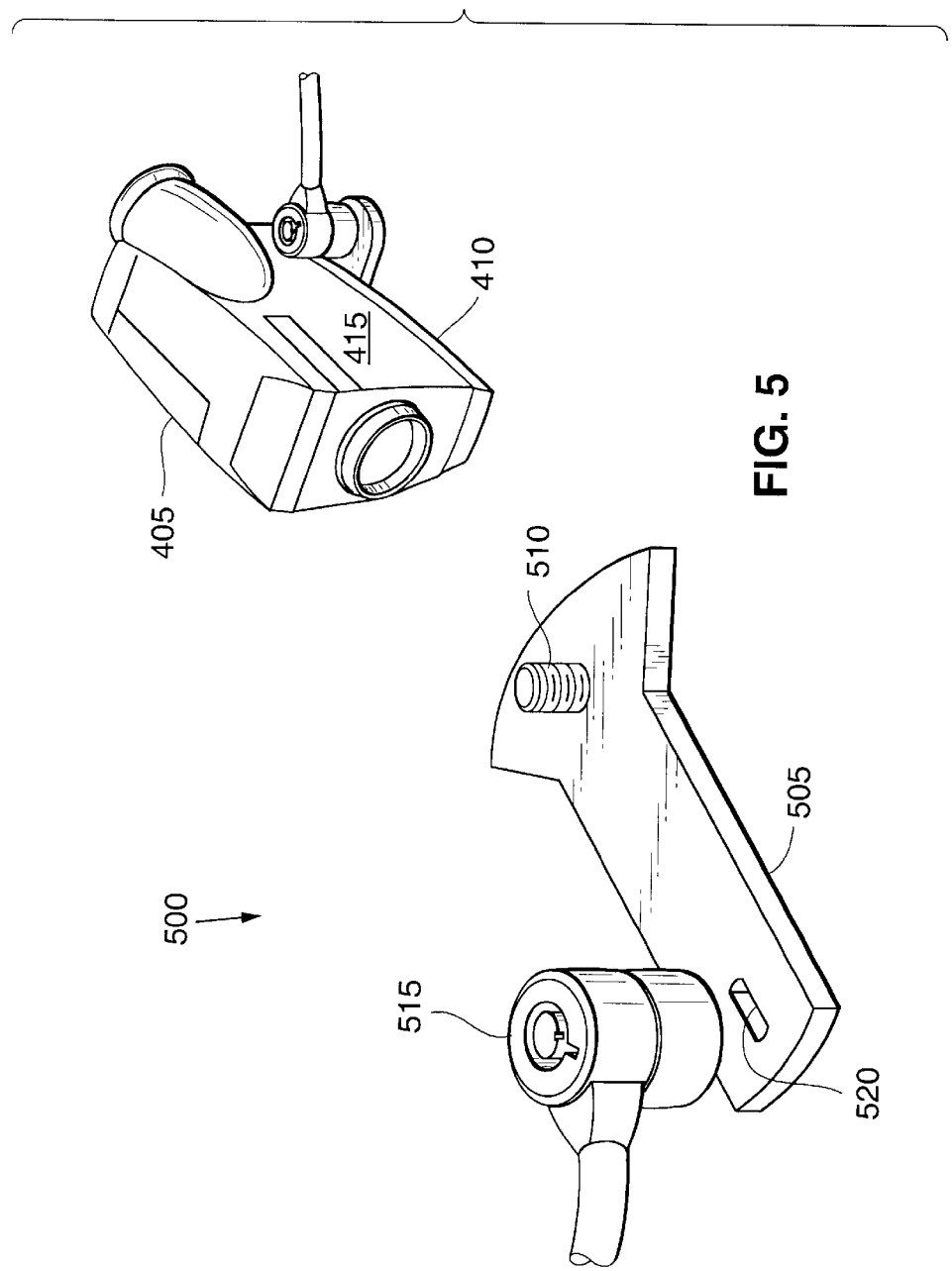
FIG. 5 is a perspective view of an alternate embodiment for an attachment device used to inhibit the theft of portable equipment having an externally exposed threaded opening.

FIG. 5 is a perspective view of an alternate embodiment for an attachment device 500 used to inhibit the theft of portable equipment 405 having an externally exposed threaded opening, e.g., a camera with a tripod opening (not shown). Attachment device 500 includes an attachment plate 505 having a threaded attachment rod 510 and a security cable 515, such as for example a KENSINGTON® MICROSAVER® security lock, manufactured, marketed and sold by Kensington Technology Group, a division of ACCO Brands, Inc., having an office at 2855 Campus Drive, San Mateo, Calif. 94403. Attachment plate 505 has a portion defining an industry standard security slot 520, measuring in the preferred embodiment about 3×7 millimeters.

In operation, attachment rod 510 is matched to the exposed threaded opening in portable equipment 405 and attachment plate 505 is rotated in a thread engaging direction to mate attachment rod 510 and the threaded exposed hole located in side 410 of portable equipment 405. Once sufficiently mated, security slot 520 extends beyond an edge of portable equipment 405.

Once mating of attachment connector 505 to portable equipment 405 is complete, security cable 515 engages security slot 520. Security cable 515, engaging slot 520 while attachment connector 505 is securely mated to portable equipment 405 functions as an obstructor which inhibits rotation of attachment rod 510 in an thread disengaging direction. Security cable 515 includes an attachment head that inhibits rotation in the thread disengaging direction by interfering with side 415 and thereby maintains the coupling of attachment connector 505 to portable equipment 405.

Security cable 515, including a chain or cable, also functions as a localizer to constrain movement of portable equipment 405 to a predetermined distance from a second object (other than portable equipment 405) to which security cable 515 is affixed.

Figure 6:
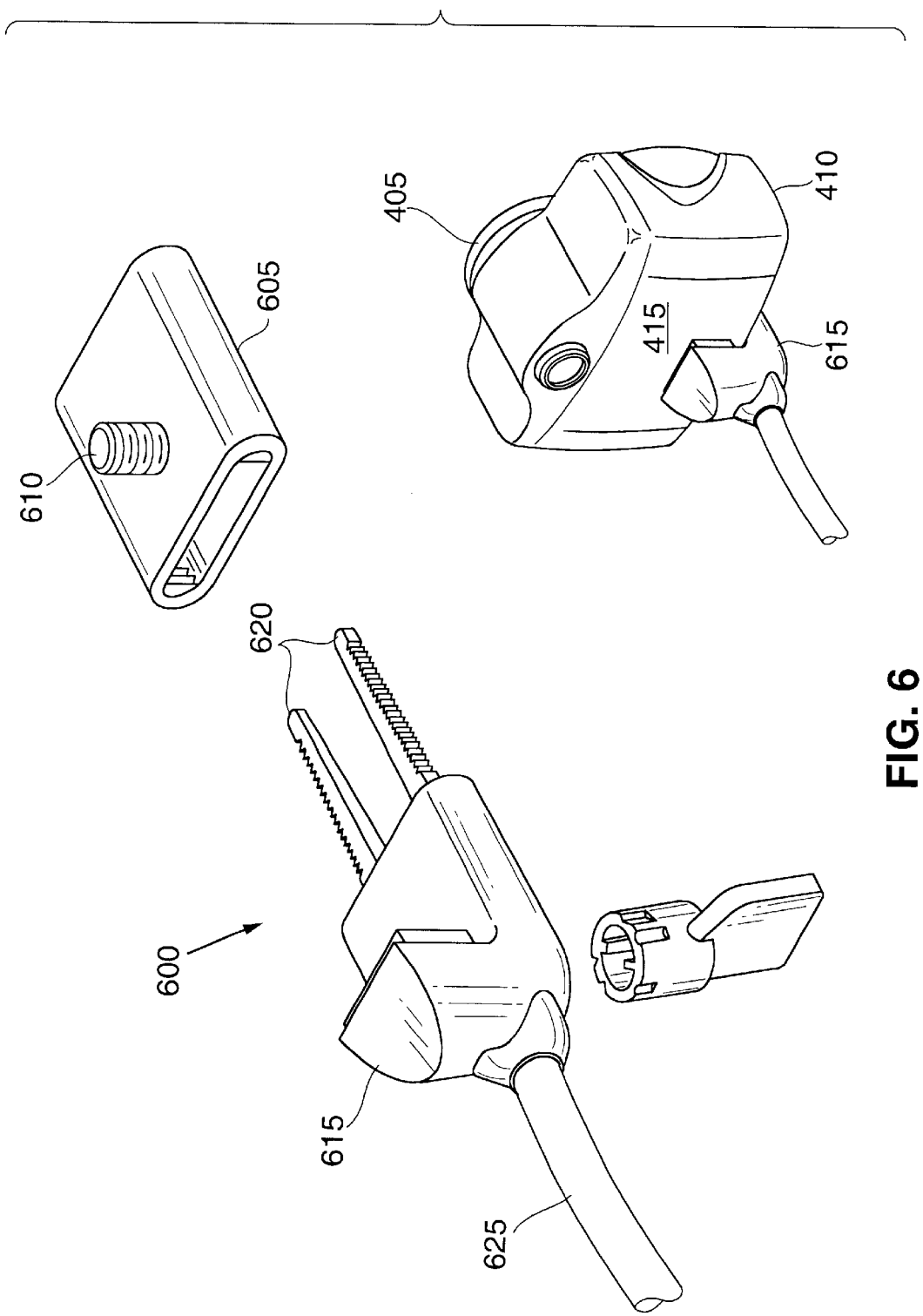
FIG. 6 is a perspective view of an alternate embodiment for an attachment device used to inhibit the theft of portable equipment having an externally exposed threaded opening.

FIG. 6 is a perspective view of an alternate embodiment for an attachment device 600 used to inhibit the theft of portable equipment 405 having an externally exposed threaded opening, e.g., a camera with a tripod opening (not shown). Portable equipment 405 includes a first side 410 and a second side 415 generally orthogonal to first side 410.

Attachment device 600 includes an attachment connector 605 having a threaded attachment rod 610 and an obstructor/localizer 615 that couples to attachment connector 605. Attachment plate 605 includes a cavity provided with internal clamps (not shown). Obstructor/localizer 615 includes a pair of steel ratchet toothed pins 620 that mate with and engage the internal clamps of attachment plate 605 when obstructor/localizer 615 is coupled to attachment connector 605. In this preferred embodiment, pins 620 have ratchet teeth exposed on outside lateral edges.

Actuation of an unlocking mechanism, such as for example by a key, internal to obstructor/localizer 615 squeezes pins 620 together to disengage pins 620 from the internal clamps within attachment connector 605. Disengaging pins 620 from the internal clamps permits decoupling of obstructor/localizer 615 from attachment connector 605. In some embodiments, it may be desirable to dispose ratchet teeth of pins 620 on the inside lateral edge and have actuation of the internal locking mechanism separate pins 620 from one or more centrally disposed clamps within the cavity of attachment connector 605. Obstructor/localizer 615 includes a cable or chain 625 for attachment to an object other than portable equipment 405.

In operation, attachment rod 610 is matched to the exposed threaded opening in portable equipment 405 and attachment connector 605 is rotated in a thread engaging direction to mate attachment rod 610 and the threaded exposed hole located in side 410 of portable equipment 405. Once sufficiently mated and the cavity of attachment connector 610 opens toward side 415, obstructor/localizer 615 is coupled to attachment connector 610. The coupling is accomplished by engaging pins 620 to the clamps in the cavity of attachment connector 605 until a head of obstructor/localizer 615 snugs up against side 415. The length of pins 620 and the relative depth of the cavity permits attachment device 600 to operate in conjunction with different sized portable equipment.

Once mating of attachment connector 605 to portable equipment 405 is complete and obstructor/localizer 615 is coupled to attachment connector 605, the head of obstructor/localizer 615 inhibits rotation in the thread disengaging direction by interfering with side 415 and thereby maintains the coupling of attachment connector 605 to portable equipment 405.

Obstructor/localizer 615, including a chain or cable in this preferred embodiment, functions as a localizer by constraining movement of portable equipment 405 to a predetermined distance from a second object (other than portable equipment 405) to which obstructor/localizer 615 is affixed.

Figure 7:
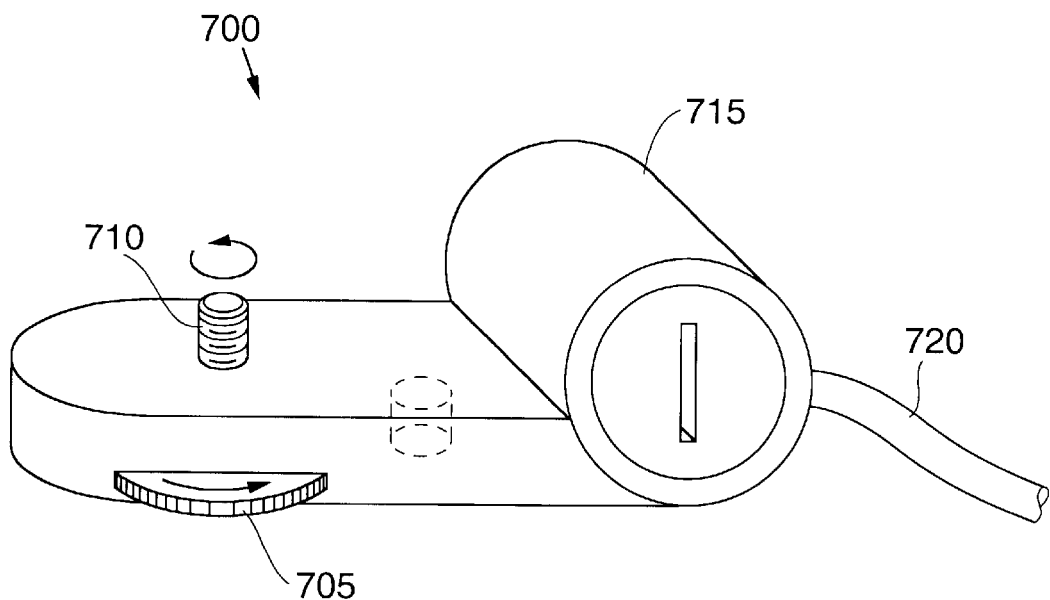
FIG. 7 is a perspective view of an alternate embodiment for an attachment device used to inhibit the theft of portable equipment having an externally exposed threaded opening.

FIG. 7 is a perspective view of an alternate embodiment for an attachment device 700 used to inhibit the theft of portable equipment having an externally exposed threaded opening, e.g., a camera with a tripod opening. The portable equipment includes a first side and a second side generally orthogonal to the first side.

Attachment device 700 includes an attachment connector 705 having a threaded attachment rod 710, an obstructor 715 that couples to attachment connector 705 and a localizer 720 coupled to obstructor 715. In this embodiment, attachment connector 705 is preferably a rotatable thumbwheel that directly drives attachment rod in a thread engaging direction or a thread disengaging direction. Attachment connector 705 is lockable to inhibit rotation. Obstructor 715 abuts the second side wall when attachment rod 710 is engaged with the externally exposed threaded opening. When attachment connector 705 is in its locked mode, neither attachment connector 705 or the entire locking device 700 may be rotated to effect rotation of attachment rod 710 in the thread disengaging direction.

Figure 8:
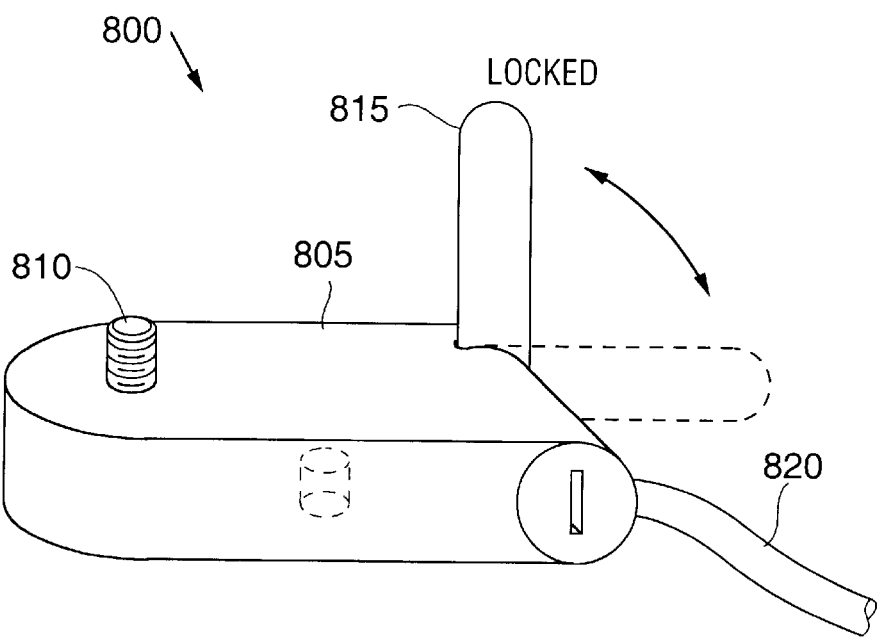
FIG. 8 is a perspective view of an alternate embodiment for an attachment device used to inhibit the theft of portable equipment having an externally exposed threaded opening.

FIG. 8 is a perspective view of an alternate embodiment for an attachment device 800 used to inhibit the theft of portable equipment having an externally exposed threaded opening, e.g., a camera with a tripod opening. The portable equipment includes a first side and a second side generally orthogonal to the first side.

Attachment device 800 includes an attachment connector 805 having a threaded attachment rod 810, an obstructor 815 that couples to attachment connector 805 and a localizer 820 coupled to attachment connector 805. In this embodiment, obstructor 815 is preferably a rotatable lever that selectively moves between an obstructing mode and a non-obstructing mode. Obstructor 815 is lockable to inhibit rotation or movement between its modes.

When it is desired to rotate attachment rod 810 in either the thread engaging direction or the thread disengaging direction, obstructor 815 is operated into the non-obstructing mode. Rotation of attachment connector 805 in the appropriate direction rotates attachment rod 810 to engage the exposed threaded opening. Once securely mated, obstructor 815 is operated into the obstructing mode to abut the second side wall. When obstructor 815 is in its obstructing mode, attachment connector 805 may not be rotated to effect rotation of attachment rod 810 in the thread disengaging direction.

Figure 9:
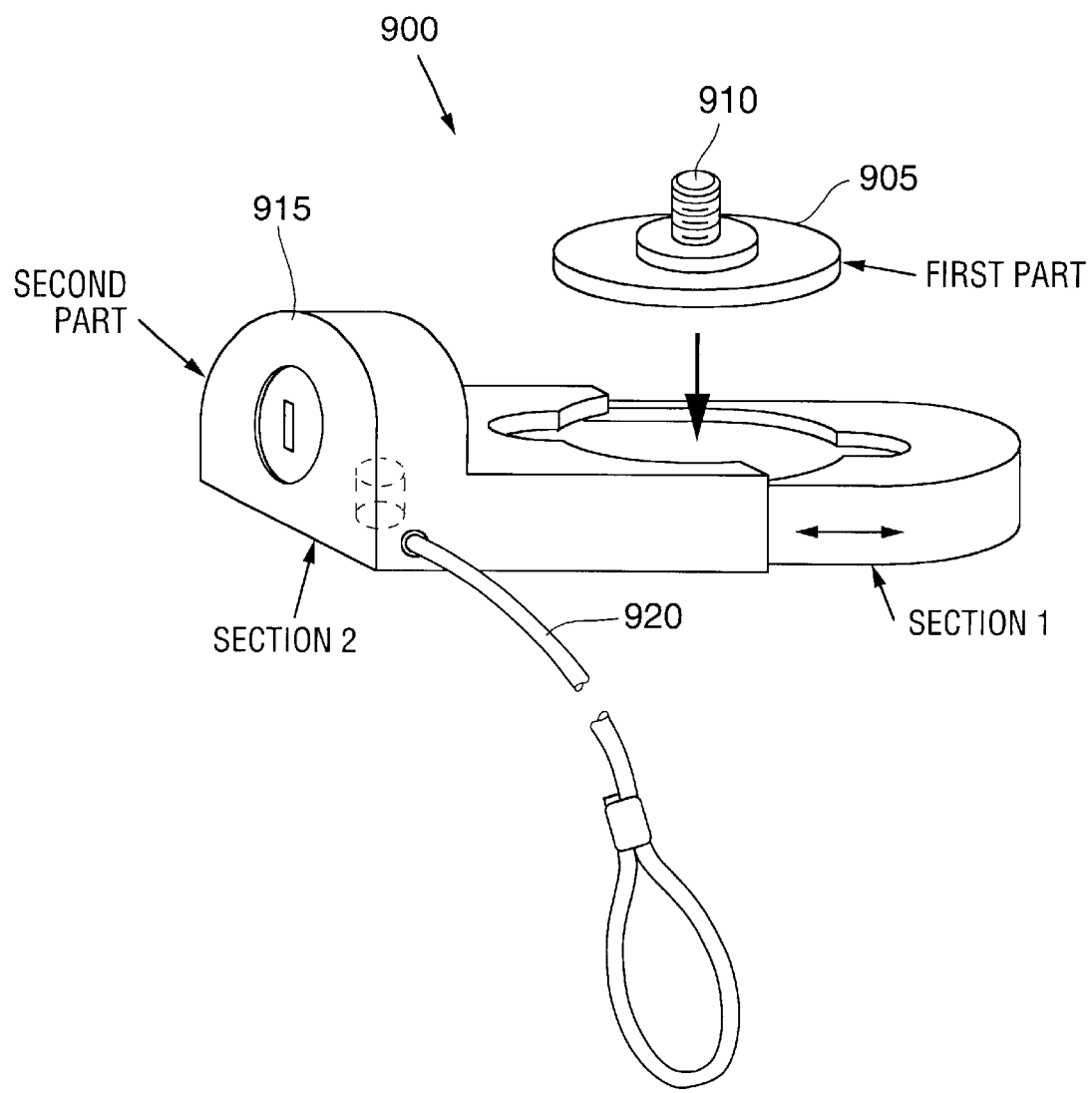
FIG. 9 is a perspective view of an alternate embodiment for an attachment device used to inhibit the theft of portable equipment having an externally exposed threaded opening.

FIG. 9 is a perspective view of an alternate embodiment for an attachment device 900 used to inhibit the theft of portable equipment having an externally exposed threaded opening, e.g., a camera with a tripod opening. The portable equipment includes a first side and a second side generally orthogonal to the first side.

Attachment device 900 includes an attachment connector 905 having a threaded attachment rod 910, an obstructor 915 that couples to attachment connector 905 and a localizer 920 coupled to obstructor 915. In this embodiment, locking device 900 includes two distinct parts. The first part includes attachment connector 905 and attachment rod 910. The first part is freely engageable to or disengageable from the exposed external threaded opening by rotating attachment connector 905 in the desired direction.

The second part has two interconnected, slidable sections. A first section includes a cavity for capturing and retaining the first part such that attachment connector 905 freely rotates within the cavity. (Though for this embodiment it is not necessary that attachment connector 905 freely rotates due to the head of obstructor 915. In other embodiments, such as where obstructor 915 lacks the head portion, when attachment connector 905 freely rotates within the cavity of the second section, it is not possible to rotate attachment connector in the thread disengaging direction when the sections are locked together.) A second section of the second part retains and secures the first section and, depending upon a mode of a locking assembly within the second section, permits disengagement of the two sections such that attachment connector 905 may be removed from the cavity. Section two also includes a head that obstructs rotation of obstructor 915 by abutting the second side of the portable equipment. Obstructor 915 is lockable to inhibit rotation or movement between its modes.

Figure 10:
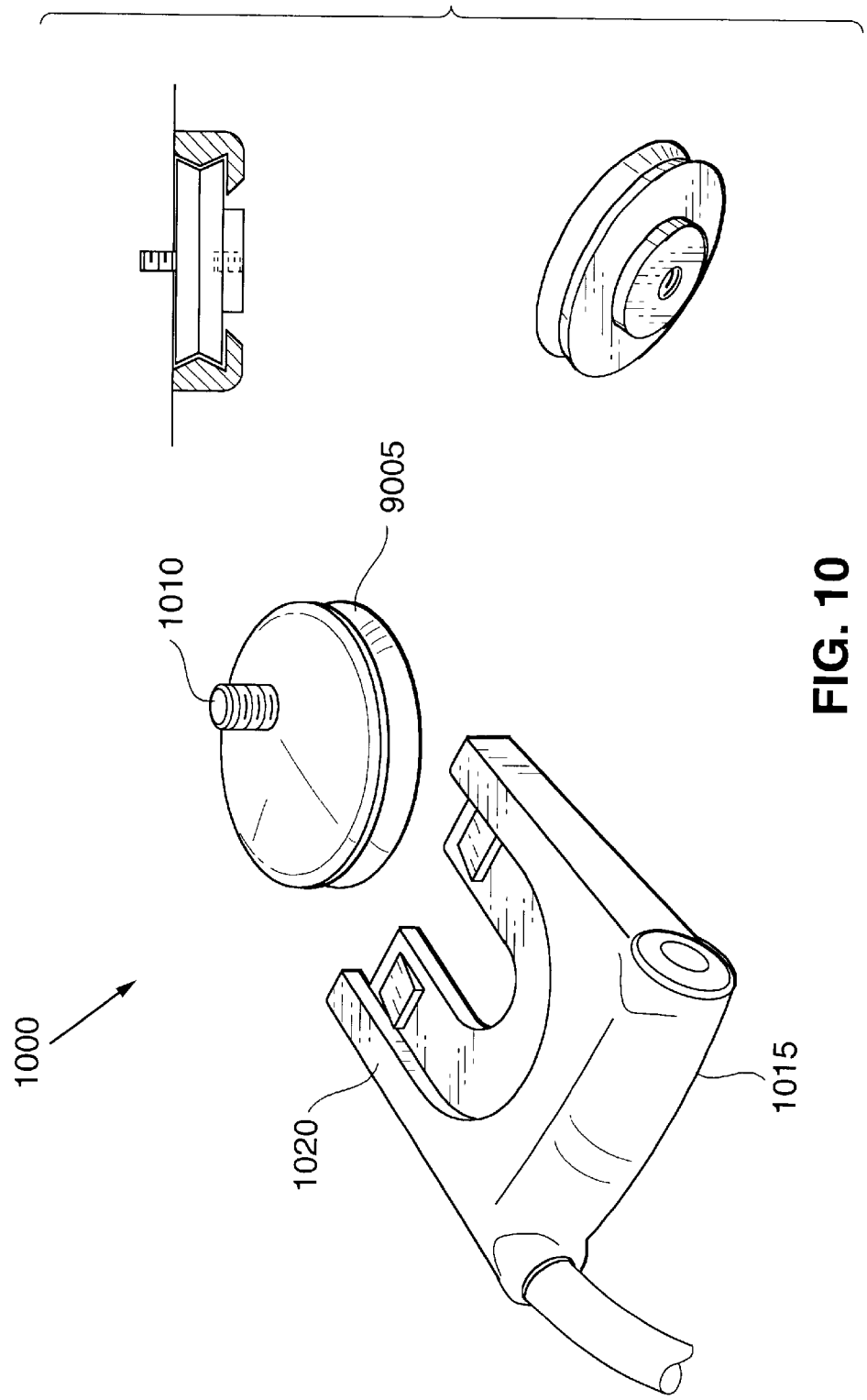
FIG. 10 is a perspective view of an alternate embodiment for an attachment device used to inhibit the theft of portable equipment having an externally exposed threaded opening.

FIG. 10 is a perspective view of an alternate embodiment for an attachment device 1000 used to inhibit the theft of portable equipment having an externally exposed threaded opening, e.g., a camera with a tripod opening. The portable equipment includes a first side and a second side generally orthogonal to the first side.

Attachment device 1000 includes an attachment connector 1005 having a threaded attachment rod 1010, an obstructor 1015 that couples to attachment connector 1005 and a localizer 1020 coupled to obstructor 1015. In this embodiment, locking device 1000 includes two distinct parts. The first part includes attachment connector 1005 and attachment rod 1010. The first part is freely engageable to or disengageable from the exposed external threaded opening by rotating attachment connector 1005 in the desired direction.

The second part is an attachment connector capturing section. The connector capturing section includes a cavity for capturing and retaining attachment connector 1005 such that attachment connector 1005 freely rotates within the cavity. (For this embodiment it is necessary that attachment connector 1005 freely rotates due to the lack of a head on obstructor 1015.) Obstructor 1015 includes a locking assembly to control the capturing of attachment connector 1005 within the free-wheeling enabling cavity of obstructor 1015, a mode of the locking assembly within obstructor 1015, permits disengagement of the two parts such that attachment connector 1005 may be removed from the cavity. When it is desired to rotate attachment rod 1010 in either the thread engaging direction or the thread disengaging direction, the locking mechanism of obstructor 1015 is operated into the attachment connector disengaging mode, removing attachment connector 1005 from obstructor 1005. Thereafter, attachment connector 1005 may be directly rotated in any desired direction.

Figure 11:
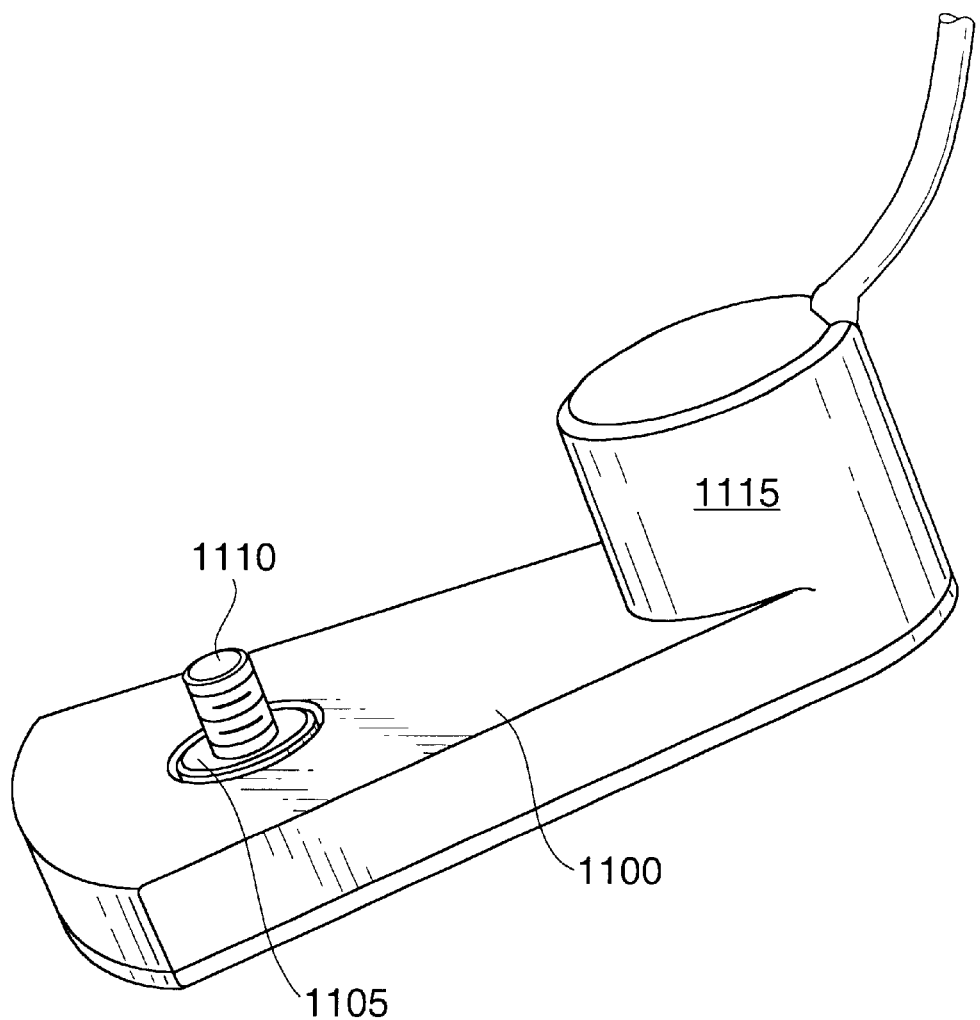
FIG. 11 is a perspective view of an alternate embodiment for an attachment device used to inhibit the theft of portable equipment having an externally exposed threaded opening.

FIG. 11 is a perspective view of an alternate embodiment for an attachment device 1100 used to inhibit the theft of portable equipment having an externally exposed threaded opening, e.g., a camera with a tripod opening. The portable equipment includes a first side and a second side generally orthogonal to the first side.

Figure 12:
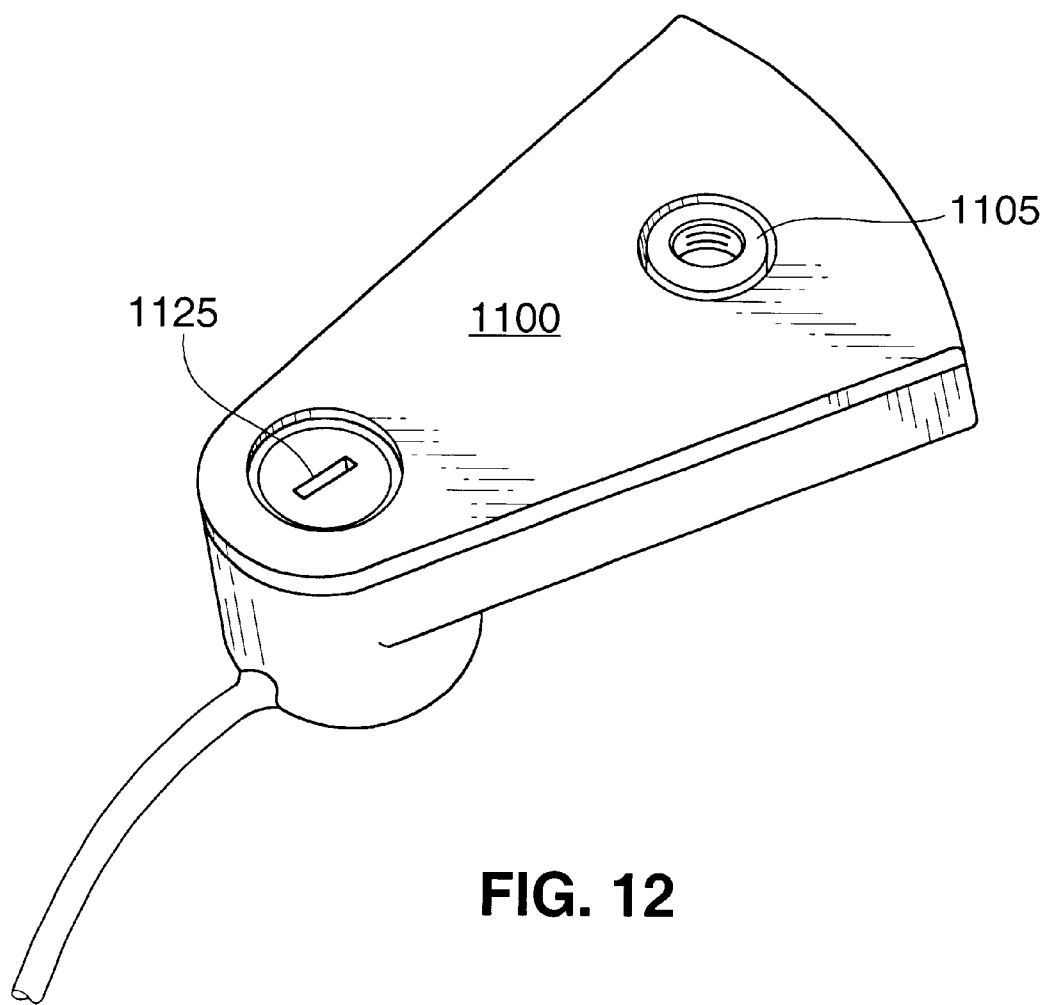
FIG. 12 is an alternate perspective view of the alternate embodiment shown in FIG. 11, illustrating the underside of the attachment device.

Attachment device 1100 includes an attachment connector 1105 having a threaded attachment rod 1110, an obstructor 1115 that couples to attachment connector 1105 and a localizer 1120 coupled to obstructor 1015. In this embodiment, locking device 1100 includes two distict parts. The first part includes attachment connector 1105 and attachment rod 1110. The first part is freely engageable to or disengageable from the am exposed external threaded opening by rotating attachment connector 1105 in the desired direction while it is disengaged from obstructor 1115. FIG. 12 is an alternate perspective view of the alternate embodiment shown in FIG. 11, illustrating the underside of the attachment device 1100. In this view, locking mechanism 1125 is shown. Locking mechanism 1125 controls a retaining arm that captures and retains attachment connector 1105 within obstructor 1115. While retained, the retaining arm permits attachment connector 1105 to free-wheel relative to obstructor 1115, within bounds established by obstructor 1115 and the second side of the portable equipment, but otherwise restricts access to attachment connector 1105 by maintaining it within obstructor 1115.

Figure 13:
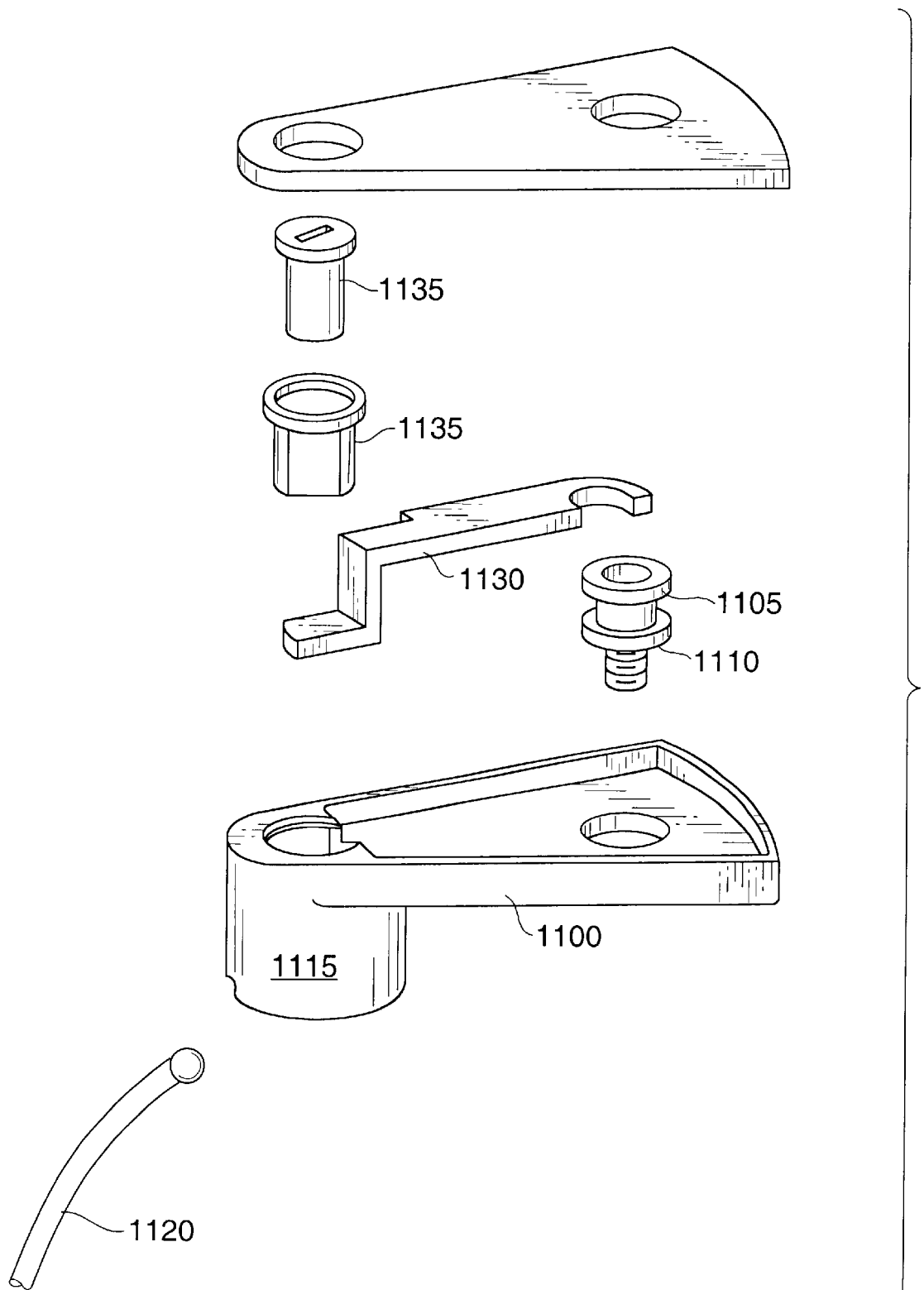
FIG. 13 is an exploded view of the alternate embodiment shown in FIGS. 11 and 12 illustrating internal components of the attachment device.

The second part is obstructor 1115 including a keyed attachment connector retaining mechanism. FIG. 13 is an exploded view of the alternate embodiment shown in FIGS. 11 and 12 illustrating internal components of attachment device 1100, specifically the elements of the keyed attachment connector retaining mechanism. The keyed attachment connector retaining mechanism includes a retaining arm 1130 and locking assembly 1135. Obstructor 1115 includes locking assembly 1135 to control the capturing of attachment connector 1105 within obstructor 1115. In one mode of locking assembly 1135, retaining arm is moved away from and thereby disengages attachment connector 1 such that attachment connector 1005 may be removed from the cavity. When it is desired to rotate attachment rod 1010 in either the thread engaging direction or the thread disengaging direction, the locking mechanism of obstructor 1015 is operated into the attachment connector disengaging mode, removing attachment connector 1005 from obstructor 1005. Thereafter, attachment connector 1005 may be directly rotated in any desired direction.

FIG. 13 is an exploded view of the alternate embodiment shown in FIGS. 11 and 12 illustrating internal components of the attachment device.

The device may be made of metal or any suitably strong and rigid material. In some embodiments, the device is made with two separate parts or it can be molded in one piece. In short, the device lends itself to economic manufacture. This consideration in addition to its apparent match to an observed need, should encourage use of the device in securing expensive equipment that has a threaded hole.

From the foregoing description it is believed that the preferred embodiment achieves the objects of the present invention. Alternative embodiments and various modifications such as discussed herein and apparent to those skilled in the art, are considered to be within the spirit and scope of the present invention.

What is claimed is:

1. An attachment device for portable equipment having a housing including a first side and a second side generally orthogonal to the first side with an externally exposed threaded opening in the first side, comprising:

an attachment connector having an attachment rod including threads complementary to the threaded opening wherein rotation of said attachment rod in an engaging direction mates said attachment rod to the threaded opening and rotation of said attachment rod in a disengaging direction detaches said attachment rod from the threaded opening;

an obstructor, coupled to said attachment connector and extending, when in a locking mode, external to and beside the second side of the housing to inhibit rotation of said attachment rod in said disengaging direction; and a localizer, coupled to said attachment connector, for attaching to an object other than to the portable equipment, to constrain movement of the portable equipment to within a limited distance of said object.

2. The attachment device of claim 1 wherein said localizer includes a cable.

3. The attachment device of claim 1 wherein said obstructor includes a bar of a padlock.

4. An attachment device for portable equipment having a housing including a first side and a second side generally orthogonal to the first side with an externally exposed threaded opening in the first side, comprising:

attachment means, including an attachment rod having threads complementary to the threaded opening wherein rotation of said attachment rod in an engaging direction mates said attachment rod to the threaded opening and rotation of said attachment rod in a disengaging direction detaches said attachment rod from the threaded opening, for attaching to the portable equipment;

obstructor means, coupled to said attachment means and extending, when in a locking mode, external to and beside the second side of the housing, for inhibiting rotation of said attachment rod in said disengaging direction; and localizer means, coupled to said attachment means, for attaching to an object other than to the portable equipment, to constrain movement of the portable equipment to within a limited distance of said object.

5. A method of inhibiting unauthorized movement of portable equipment by use of an attachment device, the portable equipment having a housing including a first side and a second side generally orthogonal to the first side with an externally exposed threaded opening in the first side, comprising the steps of:

rotating an attachment rod of an attachment connector in an engaging direction wherein said attachment rod includes threads complementary to the threaded opening and wherein rotation of said attachment rod in said engaging direction mates said attachment rod to the threaded opening and rotation of said attachment rod in a disengaging direction detaches said attachment rod from the threaded opening;

inhibiting rotation of said attachment rod in said disengaging direction by use of an obstructor, coupled to said attachment connector and extending, when in said locking mode, external to and beside the second side of the housing; and constraining movement of the portable equipment to within a limited distance of an object other than the portable equipment by use of a localizer, coupled to said attachment connector, for attaching to said object.

* * * * *